United States Patent
Ropelé

(10) Patent No.: US 9,061,801 B2
(45) Date of Patent: Jun. 23, 2015

(54) BI-INJECTED CAP, AND METHOD FOR MANUFACTURING SUCH A CAP

(75) Inventor: Anne-Cécile Ropelé, Dijon (FR)

(73) Assignee: BERICAP, Longvic (FR)

( * ) Notice: Subject to any disclaimer, the term of this patent is extended or adjusted under 35 U.S.C. 154(b) by 0 days.

(21) Appl. No.: 14/008,295

(22) PCT Filed: Mar. 29, 2012

(86) PCT No.: PCT/EP2012/055576
§ 371 (c)(1),
(2), (4) Date: Mar. 20, 2014

(87) PCT Pub. No.: WO2012/130916
PCT Pub. Date: Oct. 4, 2012

(65) Prior Publication Data
US 2014/0190925 A1    Jul. 10, 2014

(30) Foreign Application Priority Data

Mar. 29, 2011    (FR) ..................................... 11 00925

(51) Int. Cl.
*B65D 41/04*    (2006.01)
*B65D 45/16*    (2006.01)
(Continued)

(52) U.S. Cl.
CPC ........ *B65D 41/0407* (2013.01); *B29C 45/1635* (2013.01); *B29C 45/1676* (2013.01); *B29L 2031/565* (2013.01); *B65D 41/325* (2013.01); *B65D 41/3447* (2013.01); *B65D 53/06* (2013.01)

(58) Field of Classification Search
CPC ............. B65D 41/0407; B65D 41/325; B65D 41/3447; B65D 53/06; B29C 45/1635; B29C 45/1676; B29L 2031/565

USPC ......... 215/316, 341, 343, 344, 270, 345, 329; 220/240, 288, 304, 345.1, 345.6, 806, 220/378, 289
See application file for complete search history.

(56) References Cited

U.S. PATENT DOCUMENTS 5,738,231 A * 4/1998 Montgomery .................. 215/44
5,785,201 A * 7/1998 Bordner et al. ............... 220/321
(Continued)

FOREIGN PATENT DOCUMENTS

BE        489825  A    7/1949
DE     2845690  A1    4/1980
(Continued)

OTHER PUBLICATIONS

International Search Report and Written Opinion of the International Searching Authority (in English and French) for PCT/EP2012/055576, mailed Jun. 18, 2012; ISA/EP.

*Primary Examiner* — Robert J Hicks
*Assistant Examiner* — Kareen Rush
(74) *Attorney, Agent, or Firm* — Harness, Dickey & Pierce, P.L.C.

(57) ABSTRACT

The disclosure includes a cap having a first portion made of a plastic material and forming a bottom for covering a container neck and a protective side wall for surrounding the container neck, and a second portion made of a flexible material that is compatible with the plastic material of the first portion and separate from the plastic material of the first portion, the second portion being annular and consisting of a flexible seal, which projects from the bottom toward the interior of the side wall and which is welded to the first portion. Thus, the manufacture of the stopper by molding includes injecting a flexible material to produce the flexible annular seal and then the movable portions of the mold are placed such that the flexible material is in a groove that is set back from the planar surface of the mold.

16 Claims, 3 Drawing Sheets

(51) Int. Cl.
*B65D 41/32* (2006.01)
*B29C 45/16* (2006.01)
*B65D 41/34* (2006.01)
*B65D 53/06* (2006.01)
*B29L 31/56* (2006.01)

(56) References Cited

U.S. PATENT DOCUMENTS

| | | | |
|---|---|---|---|
| 6,325,226 | B1 | 12/2001 | Krautkramer |
| 2002/0000420 | A1 | 1/2002 | Taha |
| 2004/0129667 | A1 | 7/2004 | Nusbaum et al. |
| 2006/0255002 | A1* | 11/2006 | Takamatsu et al. ........... 215/252 |
| 2008/0073312 | A1* | 3/2008 | Babcock et al. ............... 215/305 |
| 2008/0110851 | A1* | 5/2008 | Fuchs et al. ................... 215/344 |
| 2009/0159555 | A1* | 6/2009 | Druitt et al. ................... 215/344 |

FOREIGN PATENT DOCUMENTS

| | | |
|---|---|---|
| DE | 19907225 A1 | 8/2000 |
| EP | 1373086 A1 | 10/2002 |
| EP | 1600394 A1 | 11/2005 |
| FR | 2900908 A1 | 11/2007 |
| WO | WO-9308093 A1 | 4/1993 |
| WO | WO-9835881 A1 | 8/1998 |
| WO | WO-2005077777 A1 | 8/2005 |
| WO | WO-2008012426 A2 | 1/2008 |

* cited by examiner

BI-INJECTED CAP, AND METHOD FOR MANUFACTURING SUCH A CAP

CROSS-REFERENCE TO RELATED APPLICATIONS

This application is a National Phase Entry of International Application No. PCT/EP2012/055576, filed on Mar. 29, 2012, which claims priority to French Patent Application Serial No. 1100925, filed on Mar. 29, 2011, both of which are incorporated by reference herein.

TECHNICAL FIELD

The invention relates to a bi-injected cap, and more specifically, to a bi-injected cap integrating a flexible seal.

BACKGROUND

Caps are known provided with a bottom, a threaded side wall intended to be screwed on a container neck, and a primary annular sealing skirt protruding from the bottom and positioned radially inside the side wall, said skirt being intended to bear radially against a cylindrical inner wall of the neck of the container. According to document WO 98 035 881 by the applicant, this inner side wall may include an annular contact bead with the neck, said bead being situated in a free end portion of the sealing skirt and turned radially outward to allow good control of the point of contact with the neck. So as also to control the contact pressure between the skirt on the neck, it is possible to give the skirt a generally tapered shape, flaring from the bottom toward the free end, as described in application WO 2005/077777. It is also possible to provide for curving the end of the skirt, as suggested in document FR 2,900,908.

The sealing obtained with this type of cap is excellent, but the contact line ensuring sealing is situated inside the neck, away from the upper rim of the neck. The threaded outer side wall and the bottom of the cap also provide protection for the assembly of the end of the neck from dust or contaminants. Under certain extreme storage conditions, however, it has been observed that contaminants or pollution may propagate from the outside, passing through the threaded interface between the cap and the neck, as far as the rim thereof.

To combat these outside contaminations, it is possible to position one or more secondary annular sealing skirts radially between the inner face of the side wall and the primary sealing skirt and intended to bear on the rim of the neck the container, as proposed in document EP 1,600,394. However, when the cap is completely molded from plastic material, it is particularly delicate to dimension the secondary skirts so as to give them a sufficient elasticity to obtain the desired barrier effect. This type of fine secondary skirt is well suited to smooth necks, but does not accommodate necks with an imperfect geometry very well.

In application WO 08 012 426 it was proposed, to improve the sealing of a threaded covering cap traditionally including a bottom, an inwardly threaded side wall and a tamperproof strip at the end of the side wall, to combine several sealing means, and in particular: an inner annular sealing skirt protruding from the bottom of the cap to come into contact with an inner cylindrical wall of the neck, an outer annular sealing skirt, positioned radially outside the inner sealing skirt, protruding from the bottom of the cap to ensure contact with an outer wall of the rib of the neck of the container, an additional annular skirt positioned axially between the inner thread of the side wall of the cap and the tamperproof strip, protruding radially toward the inside and axially toward the tamperproof strip, the additional skirt being intended to bear elastically against a collar of the neck of the container, and an annular seal covering the portion of the bottom situated between the inner skirt and the outer skirt, and which bears on the upper rim of the neck of the bottle. It is provided that the seal, preferably made from thermoplastic elastomer (TPE), can be applied either a posteriori on a joiner machine, or bi-injected with the cap. However, no bi-injection method is described and, in practice, the bi-injection of such a cap poses technical problems.

Also known, in another context, are bi-material caps including a first portion made from a plastic material forming a bottom, a side wall protecting a container neck, and a second portion made from a flexible material, in particular thermoplastic elastomer (TPE), compatible with the plastic material of the first portion, that second portion constituting an annular sealing skirt positioned radially inside the side wall. In document EP 1,373,086, a technique is proposed for attaching such a seal on the bottom of a cap, by pouring or molding the material of the seal on the bottom provided with catching protrusions for example having a dovetail profile. The control of the bi-injection method for such caps is delicate. To prevent the flexible material making up the seal from being driven during injection of the plastic material forming the first portion of the cap, it is necessary to wait for the seal to cool.

SUMMARY

According to a first aspect of the invention, the invention aims to form a bi-material cap provided with a seal. To that end, proposed according to this first aspect of the invention is a cap including:

a first portion made of a plastic material and forming a bottom for covering a container neck and a protective side wall for surrounding the container neck, and a second portion made of a flexible material that is compatible with the plastic material of the first portion and separate from the plastic material of the first portion, the second portion being annular and consisting of a flexible seal, which projects from the bottom toward the interior of the side wall and which is welded to the first portion.

Compatible here means that the materials adhere to one another chemically and are therefore welded during overmolding.

According to one important aspect of the invention, the first portion may include an annular protuberance projecting from the bottom, the second portion being welded to the annular protuberance. Thus, during the manufacture of the cap by molding, several successive steps are carried out: first, flexible material is injected so as to form the annular flexible seal. Then, the moving portions of the mold are placed such that the flexible material is in a groove, withdrawn relative to the planar face of the mold, which will define the interior face of the bottom of the cap. During the injection of the plastic material in the mold, the plastic material fills the available volume in the groove above the flexible material. The groove guarantees the integrity of the geometry of the interface between the two materials. It is thus possible to perform the two successive injections at a high temperature, melting the interface, which allows good welding between the two materials, while preserving the integrity of the geometry of the portion made from flexible material. The axial thickness of the protuberance is preferably greater than 0.10 mm.

According to different alternative embodiments, the cap may have one or more of the following features:

- the flexible material may be an elastomer material, in particular a thermoplastic elastomer material.
- the plastic material may be a thermoplastic, in particular a polyethylene, polypropylene, polyethylene terephthalate (PET) or a PLA.
- the side wall may include an inner thread to screw on an outer thread of the neck of the container.
- a primary annular sealing skirt protruding from the bottom and positioned radially inside the side wall may equip the cap, said skirt being intended to bear radially against an inner cylindrical wall of the neck of the container, the flexible seal being positioned radially between the side wall and the primary sealing skirt;
- the distance measured radially between the primary sealing skirt and the flexible seal, measured in a plane perpendicular to the axis of revolution of the side wall at 1 mm from the bottom of the wall, is preferably greater than 0.5 mm, which characterizes the minimum thickness of the wall of the metal core defining the cavity of the mold, the outer wall of the primary sealing skirt;
- the primary sealing skirt may include an annular bead in contact with the neck, said bead being located in a free end portion of the sealing skirt and turned radially outward to make it possible to control the point of contact with the neck well;
- so as also to control the contact pressure between the primary skirt and the neck, it is possible to give the skirt a generally tapered shape, flaring from the bottom toward the free end;
- inasmuch as the primary skirt serves to interfere with an inner cylindrical wall of the neck whereas the flexible seal serves to rest on the upper edge of the neck, it is advantageous, before placement of the cap on the neck, for the geometric cylinder with the smallest diameter and which outwardly envelops the primary sealing skirt to have an intersection with the flexible seal;
- the protruding wall of the flexible seal may have a half-circle or half-ellipse profile or a square, rectangular or trapezoidal profile, to form a suitable contact surface for the rim of the neck;
- the side wall of the cap may be equipped with a tamperproof ring, connected to the body of the side wall by a frangible annular zone, for example made by a thin continuous annular connecting wall between the ring and the side wall or by bridges, said bridges being obtained either by molding or by cutting;
- in that case, it is advantageous for the portion of the primary sealing skirt intended to come into contact with the neck of the container and the free end of the flexible seal intended to come into contact with the rim of the neck of the container to be situated axially at a distance from one another that is greater than the elongation at break of the frangible zone.

According to another embodiment of the invention, the bottom of the cap may be provided with a pour spout and form a part of a cap assembly further including a cover, the spout being able to be sealed directly by the cover or by a to-and-fro valve. In that case, the bottom of the cap is not necessarily completely flat, but only over its outer annular periphery cooperating with the neck of the container, i.e., in the portion including the side wall, the flexible seal and, if applicable, the primary sealing skirt. According to another aspect of the invention, the invention relates to a container provided with a neck closed by a cap as previously described, the flexible seal of the cap bearing axially on the upper rim of the neck. In the event the cap includes a primary sealing skirt, the latter bears radially on an inner cylindrical wall of the neck.

According to another aspect of the invention, the invention relates to a method for molding a cap including at least one bottom, a side wall and an annular seal, including the following steps:

- two parts of the mold, mobile relative to one another, are placed so as to form an annular cavity with an injection orifice; a first of these parts having an annular protuberance, the annular protuberance defining an upper wall of the annular cavity, the other part having an annular groove defining a lower wall of the annular cavity, the annular protuberance penetrating the annular groove so as to close the annular cavity;
- a flexible material is injected into the annular cavity so as to fill the annular cavity,
- the two parts of the mold are separated from each other so as to form a primary cavity having a first portion intended to form the bottom of the cap, extended by a second, generally cylindrical portion intended to form the side wall of the cap, the first portion having an inner wall defining the inner face of the bottom of the cap, the annular cavity containing the flexible material emerging in the first portion of the primary cavity.

Preferably, the injection of the plastic material in the mold is done through an injection orifice aligned with the axis of symmetry of revolution of the annular cavity, which ensures symmetrical filling of the cavity and avoids potential problems of ovality of the cap. The flexible material is injected in the annular cavity through an injection orifice that is offset relative to the axis of symmetry. Certain "traces" of the method are visible on the finished cap: inasmuch as the first part forms the upper (outer) face of the bottom of the cap, that upper face has an annular groove that is the imprint of the annular protuberance of the first part, said groove being located at the flexible annular seal. Furthermore, if applicable, it is possible to see the traces of the injection orifices. The first portion of the primary cavity may be configured for a cap with a substantially flat bottom, or for cap whereof the bottom forms a spout.

BRIEF DESCRIPTION OF THE DRAWINGS

Other features and advantages of the invention will emerge from reading the following description, in reference to the appended figures, which illustrate.

DETAILED DESCRIPTION

Figure 1:
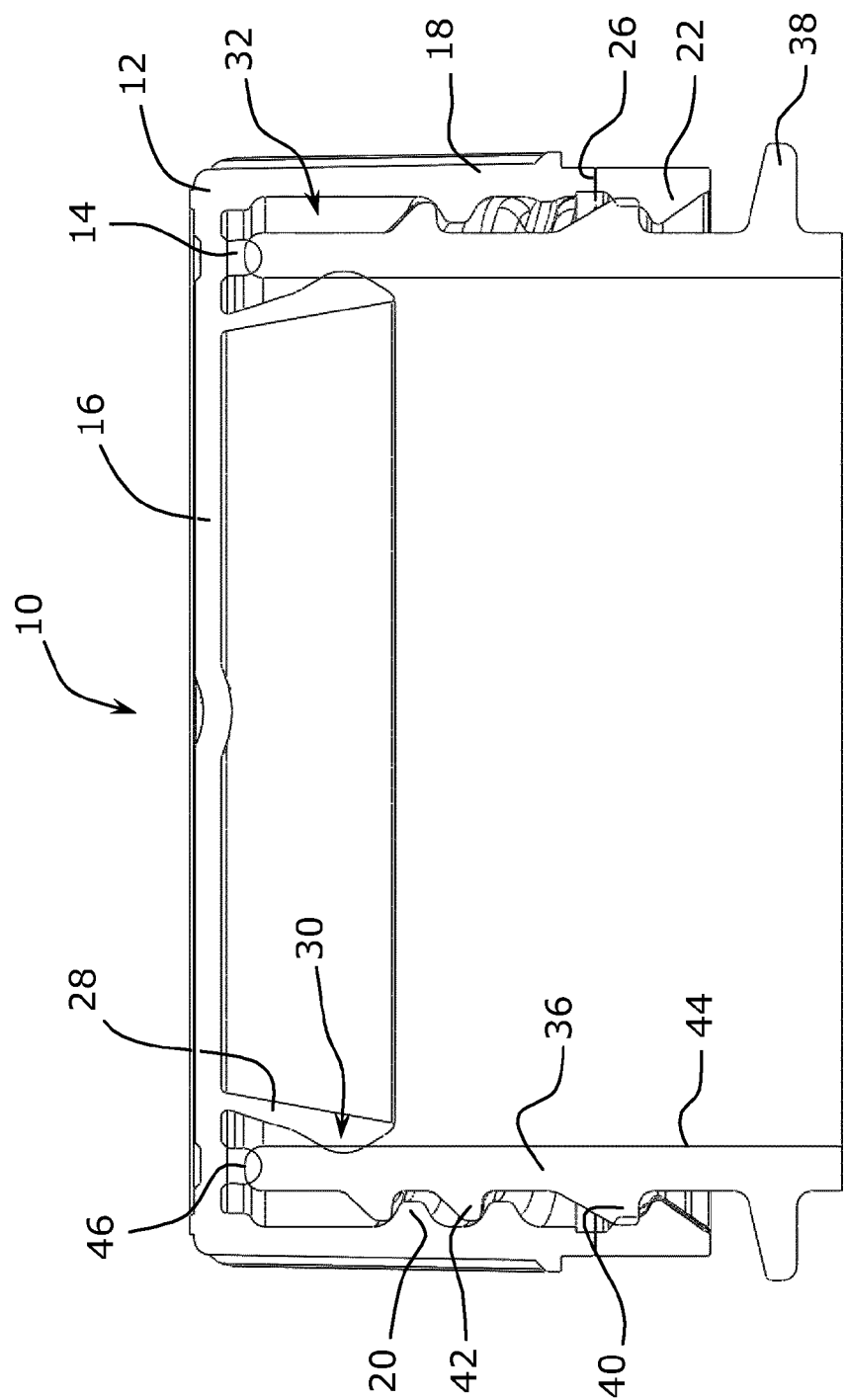
FIG. 1, a cross-sectional view of a cap according to one embodiment of the invention, mounted on a container neck.
Figure 2:
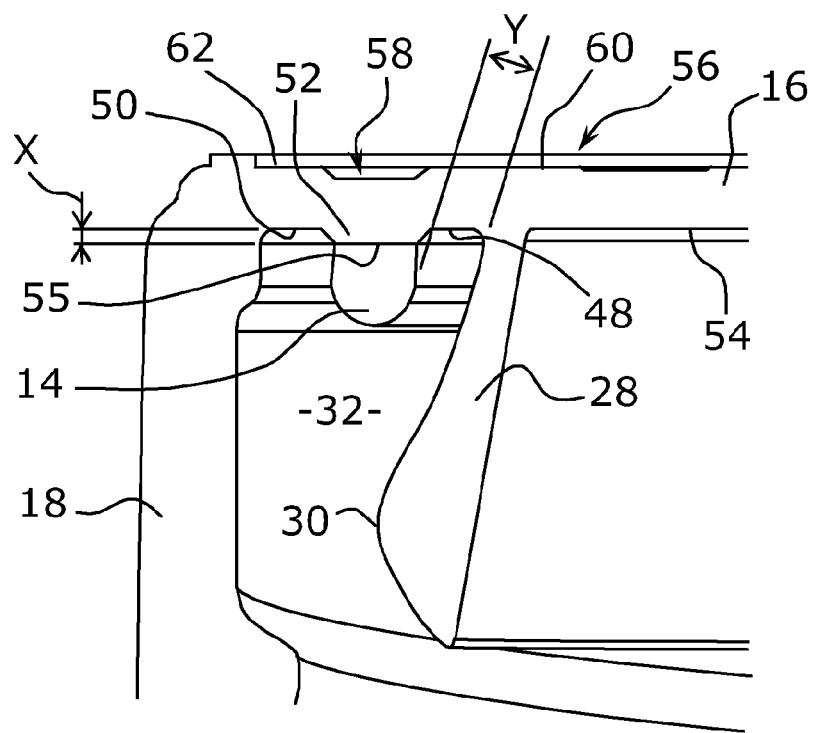
FIG. 2, a detail of the cap of FIG. 1.

FIGS. 1 and 2 show a cap 10 made up of two parts, one made from plastic intended to form an outer enclosure 12 of the cap and the other made from a flexible material, forming an annular seal 14 welded to the inside of the first part. More specifically, the enclosure 12 of the cap, in a single piece, includes a discoid bottom 16, an outer side wall 18 bearing an inner thread 20, a tamperproof ring 22 extending the free end 24 of the side wall 18 connected to the latter by material bridges 26, and a tapered sealing skirt 28 positioned inside the outer side wall 18, protruding from the bottom 16 and flaring as it moves away from the bottom 16. The sealing skirt 28 is provided with a bulge 30 at its end. An annular volume 32 is delimited between the outer side wall 18, the sealing skirt 28 and the bottom 16. The flexible seal 14 is positioned in this inner volume 32.

In FIG. 1, the cap is screwed on the neck 36 of the container, said neck traditionally including a lower collar 38 serving for handling of the container, a fastening collar 40 on which the tamperproof ring 22 is fastened, and an outer thread 42 cooperating with the inner thread 20 of the cap for screwing and unscrewing of the latter. As shown in FIG. 1, the inner volume 32 delimited by the side wall 18, the sealing skirt 28 and the bottom 16 of the cap constitutes a housing for the free end of the neck 36. The sealing skirt 28 bears radially with interference on a cylindrical inner wall 44 of the neck. The contact pressure between the skirt 28 and the neck 36 is completely controlled owing to the geometry of the bulge 30 of the skirt, the axial section of which is an arc of circle in the vicinity of the point of contact. The seal 14 bears on the upper rim 46 of the neck. The radial thickness of the seal 14 may be relatively significant, in the same order of magnitude as its largest axial thickness, and preferably greater than half of the thickness of the wall of the neck 36. The free face of the seal, turned toward the inside of the annular volume 32, may have an arc of circle section. The dimensional interference with the neck in the closed position ensures a large contact surface and high contact pressure by crushing of the seal 14. Inasmuch as the purpose of the sealing skirt is to interfere with the inner cylindrical wall of the neck whereas the flexible seal is intended to rest on the upper edge of the neck, it is advantageous, before screwing on the neck, for the geometric cylinder with the smallest diameter that outwardly envelops the primary sealing skirt to have an intersection with the flexible seal.

As shown in FIG. 2, the inner face of the bottom, in the annular volume 32, has two annular grooves 48, 50 separated by an annular protuberance 52 protruding axially inside the volume 32. These two annular grooves, one radially inner 48, located between the protuberance 52 and the skirt 28, the other radially outer 50, situated between the protuberance 52 and the side wall 18, each have a substantially planar face. The projecting face 55 of the protuberance is also substantially planar and located away from the groove bottoms, as illustrated by dimension X in FIG. 2. This projecting face 55 constitutes a weld interface for the flexible seal, which is consequently completely situated at a minimal axial distance X from the bottom of the grooves 48, 50.

The outer face 56 of the bottom has an annular groove 58 situated at the protuberance 52 and the flexible annular seal 14. This groove is radially bordered on either side by planar facets 60, 62. The profile of the groove 58 and the planar facets 60, 62 corresponds negatively to the profile of the protuberance 52 and the grooves 48, 50 of the inner face of the bottom situated in the annular volume 32.

The advantages of the protuberance will better appear in the following description of the manufacturing method for manufacturing the cap, illustrated diagrammatically in FIGS. 3 and 4. The injection mold is made up of at least two parts movable relative to one another. One of the parts is a stationary block 100 that forms the majority of the outer surface of the cap, and in particular the portion of the outer surface of the bottom of the cap situated across from the annular volume 32. The stationary block 100 in particular includes surfaces for producing the groove and the flats, and in particular a protuberance 102 fitting the shapes of the groove 58 and two planar facets 104, 106 on either side of the protuberance 102, to produce the facets 60, 62 of the outer face of the bottom 16 of the cap.

The other part is a core 108 that in particular forms the outer surface of the assembly of the cap 10, and more specifically the inner surface of the finished cap, i.e., the assembly formed by the enclosure 12 and the flexible seal 14. The core 108 therefore includes an annular groove 110 corresponding to the cavity of the flexible seal 14 and the protuberance 52 and two flat facets 112, 114 on either side of the groove 110, to produce the bottoms of the grooves 48, 50. It also includes a substantially tapered face 115 defining the outer wall of the primary seal 28. It should be noted that the shortest distance Y between the walls 110 and 115 must be sufficient to avoid making the core 108 fragile. In practice, the smallest distance Y is greater than the distance X.

Figure 3:
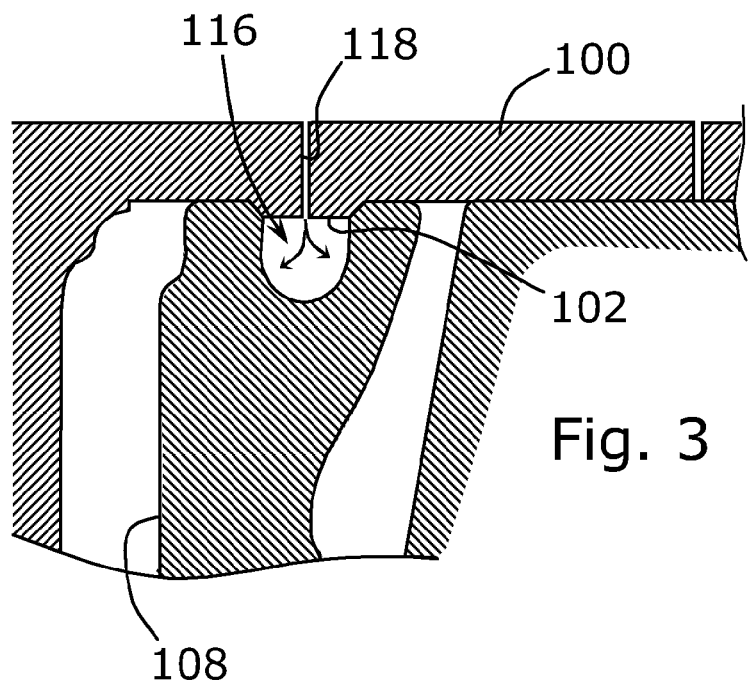
FIG. 3, a diagrammatic view of the positioning of the parts of a mold for manufacturing the cap of FIGS. 1 and 2, in a first injection phase.

In a first molding phase illustrated in FIG. 3, the core 108 is positioned in contact with the stationary block 100. The protuberance 102 partially penetrates the annular groove 110 to close it hermetically, while preserving an annular cavity 116 in the shape of the flexible seal. A flexible material is injected into the annular cavity so as to fill the annular cavity and form the seal. The injection hole 118 is located in the protuberance of the block.

Figure 4:
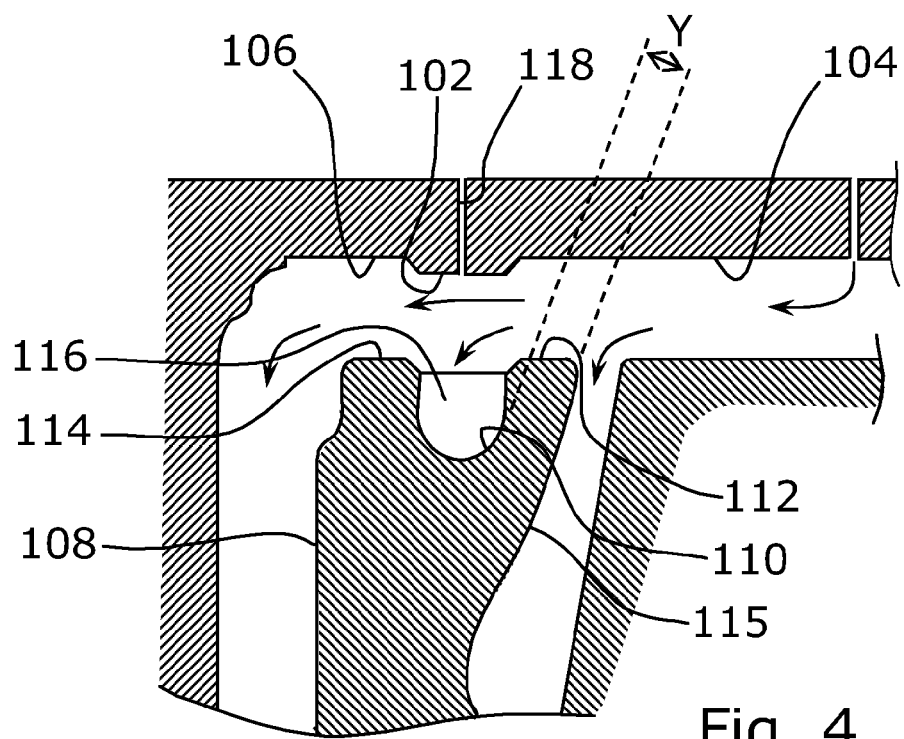
FIG. 4, a diagrammatic view of the positioning of the parts of the mold for manufacturing the cap of FIGS. 1 and 2, in a second injection phase.

At the end of this first phase, the two portions 100, 108 of the mold are moved away from each other so as to form a primary cavity whereof the imprint corresponds to the shape of the finished cap, the groove already being filled by the flexible seal, as illustrated in FIG. 4. More specifically, the cavity has a portion with a generally discoid shape intended to form the bottom of the cap, extended by a generally cylindrical portion intended for the side wall of the cap, the generally discoid portion having an inner wall defining the inner face of the bottom of the cap, the annular cavity containing the flexible material emerging in the discoid part of the primary cavity.

The plastic material will then be injected through a central injection hole. As illustrated in FIG. 4, the flexible material forming the joint is situated in a protected region of the mold, relative to the deviation of the flow of injected plastic material. This is due to the fact that the groove of the core of the mold that contains the flexible material of the seal has not been completely filled by the latter in the first injection phase. The arrows in FIG. 4 show the path of the plastic material during its injection. The groove protects the flexible material of the seal from the flow of plastic material, which prevents part of the flexible material from being carried away toward other parts of the mold. It is therefore possible to inject plastic material on the flexible material making up the seal while ensuring melting at the interface without deteriorating the geometric integrity of the seal.

The separation between the two parts of the mold corresponds to the thickness of the plastic material forming the bottom 16 of the cap. Characteristically, the thickness of plastic material is constant in the annular region of the bottom, which limits the annular cavity 32, between the sealing skirt 28 and the outer side wall 18. In the final phase, the bi-material cap is ejected by removing the core. It will be understood the groove 58, which has no specific function, results from the manufacturing method, since it is the imprint of the protuberance 102. Its depth is equal to the height X of the protuberance 52.

Figure 5:
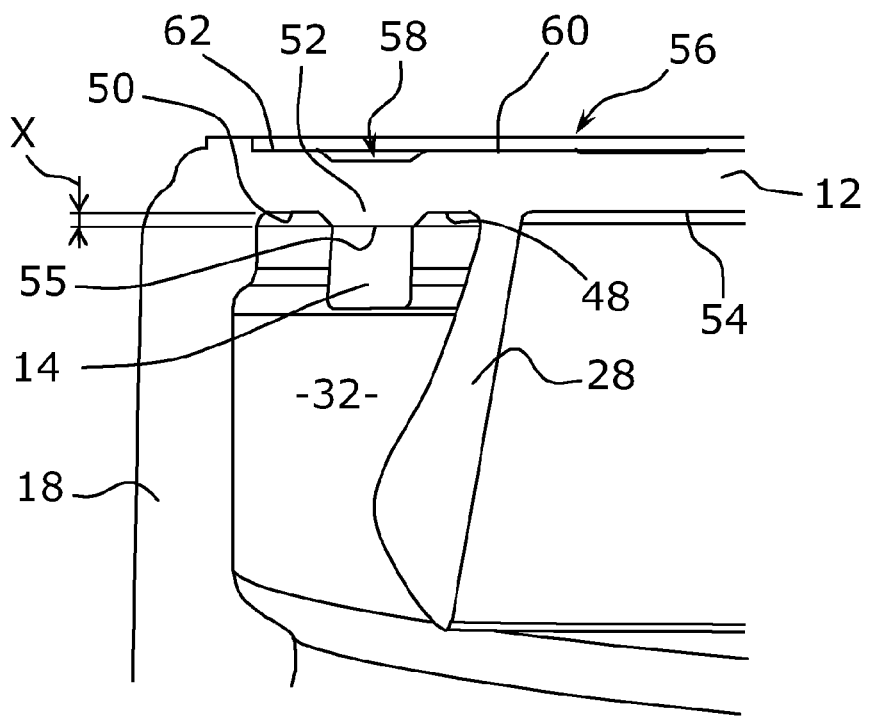
FIG. 5, a cross-sectional view of a detail of one alternative embodiment.

According to the alternative embodiment shown in FIG. 5, the annular seal 14 is configured so as to have a substantially planar annular contact surface with the upper rim of the neck of the container. This planar surface guarantees additional stability of the seal on the rim of the neck during screwing. In this example embodiment, the seal 14 has, in cross-section, a substantially square surface, the interface welded to the enclosure 12 being planar, parallel and with a dimension substantially identical to the planar annular contact surface intended to come into contact with the rim of the neck of the container.

Other seal section shapes, rectangular or more generally polygonal, can be considered, for example a trapezoidal shape. In this hypothesis, the trapezoid may be oriented with a small base serving as contact surface with the container neck and its large base serving as interface with the enclosure 12 of the cap, or conversely undercut with a small base on the interface side and large base serving as contact surface with the container, to form a dovetail seal. In the latter hypothesis, the angle of the trapezoid is preferably smaller than 10°, and preferably smaller than 5°.

Naturally, many other alternatives are possible. The weld interface with the flexible seal may be oblique, such that the thickness of the seal, measured between the weld interface and the free face, is not constant. The section of the seal is then a convex quadrilateral. Such an arrangement may allow better adaptation to necks with asymmetrical sections. More generally, the weld interface may be non-planar. The profile of the protuberance may assume various non-polygonal shapes. The profile of the grooves may differ from that of the example embodiment. The plastic part may be a spout, covered by a cover connected to the spout for example by a hinge or strap. The cover may be connected on the spout or form a single piece therewith.

The invention claimed is:

1. A bi-material cap comprising:
   a plastic portion made of a plastic material, forming a bottom for covering a container neck and a protective side wall for surrounding the container neck, the bottom of the first portion including two annular grooves and an annular protuberance separating the two annular grooves; and
   a flexible portion made of a flexible material that is different from and compatible with the plastic material of the plastic portion and separate from the plastic material of the plastic portion, the flexible portion being annular and consisting of a flexible seal, which projects from the protuberance toward the interior of the side wall and which is welded to the annular protuberance.

2. The cap of claim 1, wherein the flexible material is an elastomer material.

3. The cap of claim 1, wherein the plastic material is a thermoplastic.

4. The cap of claim 1, wherein the side wall includes an inner thread to screw on an outer thread of the neck of the container.

5. The cap of claim 1, wherein the plastic portion forms a primary annular sealing skirt protruding from the bottom and positioned radially inside the side wall, the primary sealing skirt being intended to bear radially against an inner cylindrical wall of the neck of the container, the flexible seal being positioned radially between the side wall and the primary sealing skirt.

6. The cap of claim 5, wherein the distance between the primary sealing skirt and the flexible seal, measured radially in a plane perpendicular to the axis of revolution of the side wall, tangent to a weld face between the annular protuberance and the second portion, is greater than 0.5 mm.

7. The cap of claim 5, wherein the primary sealing skirt includes an annular bead in contact with the neck, the bead being located in a free end portion of the sealing skirt and turned radially outward.

8. The cap of claim 5, wherein the primary sealing skirt has a generally flared shape from the bottom toward the free end.

9. The cap of claim 5, wherein before placement of the cap on the neck, a geometric cylinder which outwardly envelops the primary sealing skirt and has the smallest diameter possible has an intersection with the flexible seal.

10. The cap of claim 1, wherein the flexible seal has a half-circle or half-ellipse profile or a square, rectangular or trapezoidal profile.

11. The cap of claim 1, wherein the side wall of the cap is equipped with a tamperproof ring, connected to the body of the side wall by a frangible annular zone.

12. The cap of claim 11, wherein the first portion forms a primary annular sealing skirt protruding from the bottom and positioned radially inside the side wall, the primary sealing skirt being intended to bear radially against an inner cylindrical wall of the neck of the container, the flexible seal being positioned radially between the side wall and the primary sealing skirt, and wherein the portion of the primary sealing skirt intended to come into contact with the neck of the container and the free end of the flexible seal intended to come into contact with the rim of the neck of the container are situated axially at a distance from one another that is greater than the elongation at break of the frangible zone.

13. A container provided with a neck closed by the cap of claim 1, wherein the flexible seal of the cap bears on the neck.

14. The cap of claim 2, wherein the flexible material is a thermoplastic elastomer material.

15. The cap of claim 3, wherein the plastic material is one of: a polyethylene or a polypropylene.

16. A bi-material cap including:
   (a) a plastic portion made of a plastic material, forming a bottom for covering a container neck, a protective side wall for surrounding the container neck and a primary annular sealing skirt protruding from the bottom and positioned radially inside the side wall, the bottom of the plastic portion including two annular grooves positioned radially between the side wall and the primary annular sealing skirt and an annular protuberance separating the two annular grooves; and
   (b) a flexible portion made of a flexible material that is different from and compatible with the plastic material of the plastic portion and separate from the plastic material of the plastic portion, the flexible portion being annular and including a flexible seal which projects from the protuberance toward the interior of the side wall and which is welded to the annular protuberance, and the flexible seal being positioned radially between the side wall and the primary sealing skirt;
   wherein before placement of the cap on the neck, a geometric cylinder which outwardly envelops the primary sealing skirt, has the smallest diameter possible and has an intersection with the flexible seal.

* * * * *